US009935417B2

(12) United States Patent
Kashiwagi

(10) Patent No.: US 9,935,417 B2
(45) Date of Patent: Apr. 3, 2018

(54) OPTICAL-POWER MONITORING DEVICE, FIBER LASER, AND OPTICAL-POWER MONITORING METHOD HAVING DIFFERENT REGIONS OF A SECOND FIBER COVERED BY A LOW-REFRACTIVE-INDEX RESIN LAYER AND A HIGH-REFRACTIVE-INDEX RESIN LAYER

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 31 days.

(21) Appl. No.: 15/243,229

(22) Filed: Aug. 22, 2016

(65) Prior Publication Data

US 2016/0359289 A1 Dec. 8, 2016

Related U.S. Application Data

(63) Continuation of application No. PCT/JP2014/079989, filed on Nov. 12, 2014.

(30) Foreign Application Priority Data

Feb. 24, 2014 (JP) ................... 2014-033337

(51) Int. Cl.
*H01S 3/00* (2006.01)
*G02B 6/42* (2006.01)
(Continued)

(52) U.S. Cl.
CPC .......... *H01S 3/0014* (2013.01); *G01J 1/4257* (2013.01); *G02B 6/264* (2013.01); *G02B 6/4286* (2013.01);
(Continued)

(58) Field of Classification Search
CPC ..... G01J 1/4257; G02B 6/264; G02B 6/4286; G02B 6/4287; H01S 3/0014; H01S 3/06704
(Continued)

(56) References Cited

U.S. PATENT DOCUMENTS 4,797,555 A 1/1989 La Mar
8,213,791 B2 * 7/2012 Kojima ................ G02B 6/4201
398/141
(Continued)

FOREIGN PATENT DOCUMENTS

JP 63-249118 A 10/1988
JP 63-304209 A 12/1988
(Continued)

OTHER PUBLICATIONS

Office Action dated Mar. 2, 2017, issued in counterpart Chinese Patent Application No. 201480076116.1, with English translation. (11 pages).
(Continued)

Primary Examiner — Que T Le
(74) Attorney, Agent, or Firm — Westerman, Hattori, Daniels & Adrian, LLP

(57) ABSTRACT

The light power monitoring device includes: a first optical fiber; a second optical fiber connected to the first optical fiber; a low-refractive-index resin layer which covers (i) a connection between the first and the second optical fibers and (ii) a predetermined region of the second optical fiber which region extends from the connection toward a forward-propagating-light-output side; a high-refractive-index resin layer which covers a region of the second optical fiber which region is not covered by the low-refractive-index resin layer; and an outputted light detecting device which is provided at a position corresponding to an end of the low-refractive-
(Continued)

index resin layer which end is located on the forward-propagating-light-output side of the second optical fiber or at a position which is away toward the forward-propagating-light-output side of the second optical fiber from the position corresponding to the end of the low-refractive-index resin layer.

12 Claims, 7 Drawing Sheets

(51) Int. Cl.
    *G01J 1/42* (2006.01)
    *G02B 6/26* (2006.01)
    *H01S 3/067* (2006.01)
    *H01S 3/094* (2006.01)

(52) U.S. Cl.
    CPC .......... *G02B 6/4287* (2013.01); *G02B 6/4291* (2013.01); *H01S 3/0675* (2013.01); *H01S 3/06704* (2013.01); *H01S 3/094007* (2013.01)

(58) Field of Classification Search
    USPC ................................ 250/227.14, 227.21, 221
    See application file for complete search history.

(56) References Cited

U.S. PATENT DOCUMENTS

| | | |
|---|---|---|
| 2010/0188735 A1 | 7/2010 | Tamaoki |
| 2011/0140011 A1 | 6/2011 | Uchida |
| 2013/0016740 A1 | 1/2013 | Saracco |
| 2013/0087694 A1 | 4/2013 | Creeden et al. |
| 2013/0259069 A1 | 10/2013 | Miyato et al. |
| 2015/0021303 A1 | 1/2015 | Funaki et al. |

FOREIGN PATENT DOCUMENTS

| | | |
|---|---|---|
| JP | 2-3 A | 1/1990 |
| JP | 2004-151667 A | 5/2004 |
| JP | 2004-317630 A | 11/2004 |
| JP | 2005-128099 A | 5/2005 |
| JP | 2006-98502 A | 4/2006 |
| JP | 2008-187100 A | 8/2008 |
| JP | 2010-32273 A | 2/2010 |
| JP | 2010-32650 A | 2/2010 |
| JP | 2010-171322 A | 8/2010 |
| JP | 2011-186399 A | 9/2011 |
| JP | 2011-192670 A | 9/2011 |
| JP | 2011-211220 A | 10/2011 |
| JP | 2012-179627 A | 9/2012 |
| JP | 2013-24738 A | 2/2013 |
| JP | 2013-146752 A | 8/2013 |
| JP | 2013-174583 A | 9/2016 |
| WO | 2012/073952 A1 | 6/2012 |

OTHER PUBLICATIONS

International Search Report dated Feb. 10, 2015, issued in counterpart International Application No. PCT/JP2014/079989 (2 pages).

Office Action dated Nov. 21, 2017, issued in counterpart Japanese Application No. 2014-033337, with English achine translation. (14 pages).

* cited by examiner

OPTICAL-POWER MONITORING DEVICE, FIBER LASER, AND OPTICAL-POWER MONITORING METHOD HAVING DIFFERENT REGIONS OF A SECOND FIBER COVERED BY A LOW-REFRACTIVE-INDEX RESIN LAYER AND A HIGH-REFRACTIVE-INDEX RESIN LAYER

This application is a Continuation of PCT International Application No. PCT/JP2014/079989 filed in Japan on Nov. 12, 2014, which claims the benefit of Patent Application No. 2014-033337 filed in Japan on Feb. 24, 2014, the entire contents of which are hereby incorporated by reference.

TECHNICAL FIELD

The present invention relates to (i) a light power monitoring device which measures power of light leaking from an optical fiber and (ii) a light power monitoring method for measuring power of light leaking from an optical fiber. Moreover, the present invention relates to a fiber laser including such a light power monitoring device.

BACKGROUND ART

In the field of laser processing, more and more fiber lasers have been used according to a recent increase in their power.

Here, a decrease in power of excitation light, an increase in loss occurring in an optical fiber, or the like may cause a decrease in power of light outputted from a fiber laser. Furthermore, while an object is being processed (an object is being irradiated with laser light) with use of the fiber laser, light reflected by the object may return to the fiber laser. This may cause an oscillation state of outputted light to be unstable, and may accordingly cause a variation in power of the outputted light. That is, as illustrated in FIG. 9, power of light outputted from the fiber laser may vary due to an effect of light reflected by an irradiated object. Therefore, in any of the above cases, since power of outputted light varies from original power, a processing characteristic is deteriorated.

In view of the above, the fiber laser is necessary to be configured such that a light power monitoring device monitors power of outputted light. For example, in a case where power of outputted light varies, such a variation in power of the outputted light is dealt with by adjustment to intensity of light which is caused to enter the optical fiber, depending on the power of the outputted light monitored.

As the light power monitoring device, one that is disclosed in Patent Literature 1 is, for example, known. FIG. 10 is a view schematically illustrating a main part of a light power monitoring device disclosed in Patent Literature 1.

According to a conventional light power monitoring device 101, optical fibers F1 and F2 are connected to each other at a connection 113 (see FIG. 10). The optical fibers F1 and F2 are provided on a reinforced member 115 in a state where the optical fibers F1 and F2 are covered by a high-refractive-index resin layer 114.

A reflected light detecting device 116 and an outputted light detecting device 117 are provided in a vicinity of the high-refractive-index resin layer 114, which covers the optical fibers F1 and F2. The reflected light detecting device 116 detects power of light which is part of backward-propagating light that has propagated through the optical fiber F2 in an input direction (in a direction in which the backward-propagating light propagates so as to be away from an irradiated object) and which has leaked from the connection 113. The reflected light detecting device 116 is provided on a side of the connection 113 which side is located downstream in the direction in which the backward-propagating light propagates. Meanwhile, the outputted light detecting device 117 detects power of light which is part of forward-propagating light that has propagated through the optical fiber F1 in an output direction (in a direction in which the forward-propagating light propagates so as to be away from a light source) and which has leaked from the connection 113. The outputted light detecting device 117 is provided on a side of the connection 113 which side is located downstream in the direction in which the forward-propagating light propagates. Power of leaking light detected by the reflected light detecting device 116 is essentially proportional to power of light reflected by the irradiated object which light enters the fiber laser again, whereas power of leaking light detected by the outputted light detecting device 117 is essentially proportional to power of light outputted from the fiber laser.

CITATION LIST

Patent Literature

[Patent Literature 1]
 Japanese Patent Application Publication, Tokukai, No. 2013-174583 (Publication date: Sep. 5, 2013)

SUMMARY OF INVENTION

Technical Problem

According to the above conventional configuration, the reflected light detecting device 116 and the outputted light detecting device 117 are provided in a vicinity of the connection 113 between the optical fibers F1 and F2. This causes the following problems.

That is, forward-propagating light which has leaked from the connection 113 may be directly received by both of the reflected light detecting device 116 and the outputted light detecting device 117 or may be scattered by, for example, the reinforced member 115 and consequently received by both of the reflected light detecting device 116 and the outputted light detecting device 117. Similarly, backward-propagating light which has leaked from the connection 113 may be directly received by both of the reflected light detecting device 116 and the outputted light detecting device 117 or may be scattered by, for example, the reinforced member 115 and consequently received by both of the reflected light detecting device 116 and the outputted light detecting device 117. In this case, since part of the forward-propagating light enters the reflected light detecting device 116, a measurement result obtained from the light power monitoring device 101 indicates that reflected light exists, even in a case where no reflected light exists. Furthermore, since part of the backward-propagating light enters the outputted light detecting device 117, a measurement result obtained from the light power monitoring device 101 indicates that outputted light has power greater than actual power. Therefore, it is not possible to accurately measure (i) power of light reflected to the fiber laser and (ii) power of light outputted from the fiber laser.

In such a case, the fiber laser may malfunction in a case where the fiber laser has (i) a function of stopping its operation when there is light reflected by an object irradiated with laser light or (ii) a function of stopping its operation when a value of power of outputted light is equal to or more than a predetermined value.

In order to prevent light, causing such a false detection, from entering the reflected light detecting device 116 and the outputted light detecting device 117, it is considered to provide the reflected light detecting device 116 and the outputted light detecting device 117 away from the connection 113. However, according to such a configuration, although it is possible to reduce an effect of direct light, it is difficult to reduce an effect of scattered light. Furthermore, according to such a configuration, since the reflected light detecting device 116 and the outputted light detecting device 117 are each poor in ability to receive light (see FIG. 11), the reflected light detecting device 116 and the outputted light detecting device 117 are easily adversely affected by noise. This causes a decrease in detection accuracy of the light power monitoring device.

The present invention has been made in view of the above problems, and an object of the present invention is to provide a light power monitoring device, a fiber laser, and a light power monitoring method, each allowing power of light propagating through an optical fiber to be accurately measured.

Solution to Problem

In order to attain the above object, the light power monitoring device of the present invention is a light power monitoring device for measuring power of light leaking from a side surface of an optical fiber with use of a light detecting section, including: a first optical fiber; a second optical fiber which is connected to the first optical fiber and which is located on a forward-propagating-light-output side of the first optical fiber, the forward-propagating-light-output side of the first optical fiber being a side from which forward-propagating light is outputted; a low-refractive-index resin layer which covers (i) a connection between the first and the second optical fibers and (ii) a region of the second optical fiber which region extends in a predetermined range from the connection, the low-refractive-index resin layer having a refractive index lower than that of a cladding of the second optical fiber; a high-refractive-index resin layer which covers at least a region of the second optical fiber which region is not covered by the low-refractive-index resin layer, the high-refractive-index resin layer having a refractive index equal to or higher than that of the cladding of the second optical fiber; and the light detecting section which has a light entering section and which detects light that has leaked from the cladding of the second optical fiber and has entered the light detecting section via the light entering section through the high-refractive-index-region layer, the light detecting section being provided so that the light entering section is located, in an axial direction of the first and the second optical fibers, at a position corresponding to an end of the low-refractive-index resin layer which end is located on a forward-propagating-light-output side (side to which the forward-propagating light propagates) of the second optical fiber or at a position which is away toward the forward-propagating-light-output side of the second optical fiber from the position corresponding to the end of the low-refractive-index resin layer, the forward-propagating-light-output side of the second optical fiber being a side from which the forward-propagating light is outputted.

Advantageous Effects of Invention

According to the above configuration, it is possible to accurately measure power of light propagating through an optical fiber.

BRIEF DESCRIPTION OF DRAWINGS

In FIG. 3, an end of a light receiving surface of an outputted light detecting device which end is located on an optical-fiber-connection side is in line with an end of a low-refractive-index resin layer which end is located on a forward-propagating-light-output side of an optical fiber (a side to which forward-propagating light propagates) in an axial direction of the optical fiber.

In FIG. 4, at least part of the light receiving surface of the outputted light detecting device is in line with the end of the low-refractive-index resin layer which end is located on the forward-propagating-light-output side of the optical fiber in the axial direction of the optical fiber.

DESCRIPTION OF EMBODIMENTS

The following description will discuss an embodiment of the present invention with reference to the drawings. In the present embodiment, an example will be described in which a light power monitoring device is applied to optical fibers constituting a fiber laser.

[Light Power Monitoring Device]

Figure 1:
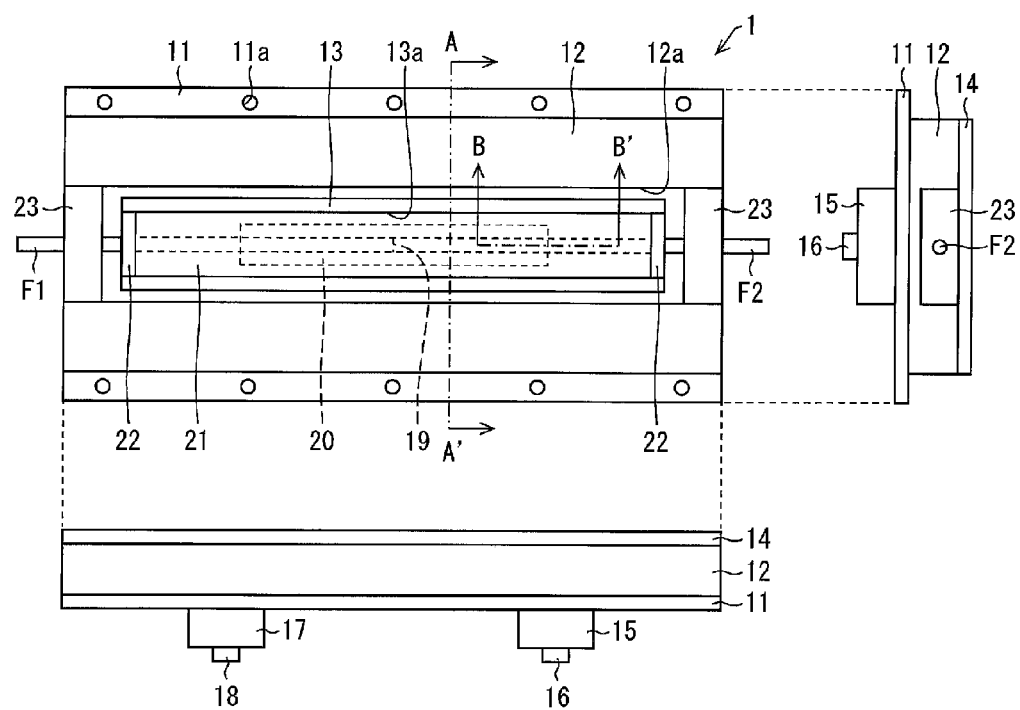
FIG. 1 is a three-side view illustrating a configuration of a light power monitoring device in accordance with an embodiment of the present invention.
Figure 2:
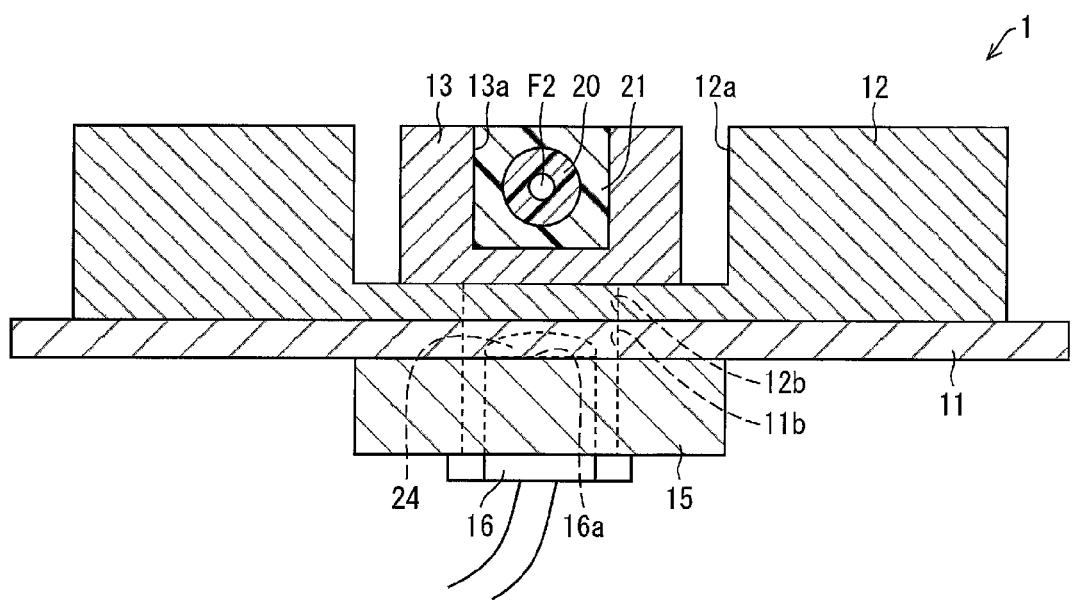
FIG. 2 is a cross-sectional view illustrating the light power monitoring device, taken along a line A-A' illustrated in FIG. 1.

FIG. 1 is a three-side view illustrating a configuration of a light power monitoring device 1 in accordance with the present embodiment (upper left: a top view, upper right: an anterior side view (right side view), lower left: front view). FIG. 2 is a cross-sectional view illustrating the light power monitoring device 1, taken along a line A-A' illustrated in FIG. 1.

The light power monitoring device 1 measures power of light leaking from a side surface (outer peripheral surface) of each of optical fibers F1 and F2 (first and second optical fibers). The light power monitoring device 1 includes a base 11, a grooved plate 12, a reinforced member 13, a cover plate 14, a fixing block 15, an outputted light detecting device (light detecting section, first light detecting section) 16, a fixing block 17, and a reflected light detecting device (light detecting section, second light detecting section) 18 (see FIGS. 1 and 2). Note that the top view in FIG. 1 does not illustrate the cover plate 14 in order to illustrate an inner structure of the light power monitoring device 1.

(Base 11)

The base 11 is a rectangular plate-shaped member, and is made of, for example, metal, such as aluminum, whose surface is subjected to black alumite treatment. The grooved plate 12 is provided on the base 11. The base 11 has a threaded hole 11a on its outer edge jutting out from the grooved plate 12 in a width direction (which is parallel to a surface of the base 11 and which is perpendicular to an axial direction of the optical fibers F1 and F2). The light power monitoring device 1 is fixed to a fiber laser device by a screw put in the threaded hole 11a.

(Grooved Plate 12)

The grooved plate 12 is a rectangular plate-shaped member, and is made of, for example, metal, such as aluminum, whose surface is subjected to black alumite treatment. The grooved plate 12 is provided on the base 11 so that an upper surface of the grooved plate 12 is parallel to an upper surface of the base 11. A lower surface of the grooved plate 12 is fixed (e.g., adhered) to the upper surface of the base 11. Note that a length of the grooved plate 12 in a longitudinal direction (the axial direction of the optical fibers F1 and F2) is identical to that of the base 11 in the longitudinal direction (the axial direction of the optical fibers F1 and F2). The grooved plate 12 has, on its upper surface, a groove 12a which extends from one end to the other end of the grooved plate 12 in the longitudinal direction.

(Reinforced Member 13)

The reinforced member 13 has a long and thin rectangular parallelepiped shape as an outer shape, and is made of, for example, metal, such as aluminum, or crystallized glass, such as Neoceram (registered trademark). Metal such as aluminum has a good light reflecting function, and Neoceram has a good light scattering function as a light scatterer.

The reinforced member 13 is provided in the groove 12a of the grooved plate 12 so as to be parallel to the groove 12a. A lower surface of the reinforced member 13 is fixed (e.g., adhered) to a bottom surface of the groove 12a. A length of the reinforced member 13 is shorter than that of the grooved plate 12, and a width of the reinforced member 13 is narrower than that of the groove 12a. The reinforced member 13 has, on its upper surface, a groove 13a which extends from one end to the other end of the reinforced member 13 in the longitudinal direction.

(Optical Fibers F1 and F2, Low-Refractive-Index Resin Layer 20, High-Refractive-Index Resin Layer 21)

The optical fibers F1 and F2 are provided in the groove 13a of the reinforced member 13 in a state where an end surface of the optical fiber F1 and an end surface of the optical fiber F2 are spliced together by fusion. Note that the optical fibers F1 and F2 are configured such that laser light propagates from the optical fiber F1 to the optical fiber F2. A low-refractive-index resin layer 20 covers (i) a connection 19 between the optical fibers F1 and F2 and (ii) respective regions of the optical fibers F1 and F2 which regions are located in a vicinity of the connection 19, that is, on respective both sides of the connection 19 (which both sides are located in the axial direction of the optical fibers F1 and F2). The low-refractive-index resin layer 20 has a refractive index lower than that of a cladding of each of the optical fibers F1 and F2.

Note that, in a case where the reinforced member 13 is made of aluminum, part of the reinforced member 13 which part faces the low-refractive-index resin layer 20 is preferably a part subjected to black alumite treatment (light absorbing part). Note that part of the reinforced member 13 which part does not face the low-refractive-index resin layer 20 is a light reflecting part. In this case, the reinforced member 13 is capable of absorbing unnecessary light around the low-refractive-index resin layer 20 (for example, light leaking from the connection 19 between the optical fibers F1 and F2). Furthermore, the reinforced member 13 is capable of reflecting light leaking from respective regions of the optical fibers F1 and F2 which regions are not covered by the low-refractive-index resin layer 20, thereby causing more such leaking light to enter corresponding one of the outputted light detecting device 16 and the reflected light detecting device 18. This allows an increase in detection accuracy of the light power monitoring device 1.

The optical fibers F1 and F2 and the low-refractive-index resin layer 20, which are provided in the groove 13a of the reinforced member 13, are covered by a high-refractive-index resin layer 21 with which the groove 13a is filled. The high-refractive-index resin layer 21 has a refractive index equal to or higher than that of the cladding of each of the optical fibers F1 and F2.

Note that, in a process of producing the light power monitoring device 1, the optical fibers F1 and F2 are coated with a resin to be the low-refractive-index resin layer 20, the resin is cured, and then the optical fibers F1 and F2 thus coated with the low-refractive-index resin layer 20 is disposed in the groove 13a of the reinforced member 13. Next, the groove 13a is filled with a resin to be the high-refractive-index resin layer 21, and then the resin is cured, so that the optical fibers F1 and F2 and the low-refractive-index resin layer 20 are covered by the high-refractive-index resin layer 21.

Note that the high-refractive-index resin layer 21 can alternatively cover at least the respective regions of the optical fibers F1 and F2 which regions are not covered by the low-refractive-index resin layer 20.

Note also that the high-refractive-index resin layer 21 can be replaced with a transparent material having a refractive index equal to or higher than that of the cladding of each of the optical fibers F1 and F2. Examples of such an alternative encompass glass having a refractive index higher than that of the cladding (outermost cladding) of each of the optical fibers F1 and F2. Note that the high-refractive-index resin layer 21 can be cured after being poured into the groove 13a. Therefore, the high-refractive-index resin layer 21 is advantageous in that a gap (air layer) is not easily formed between the high-refractive-index resin layer 21 and the groove 13a, as compared with a case where a pre-molded member is fit into the groove 13a.

End resin layers 22 are provided at respective both ends of the groove 13a of the reinforced member 13 which both ends are located in the axial direction of the optical fibers F1 and F2. The optical fibers F1 and F2 are fixed to the reinforced member 13 by the respective end resin layers 22. End resin layers 23 are provided at respective both ends of the groove 12a of the grooved plate 12 which both ends are located in the axial direction of the optical fibers F1 and F2. The optical fibers F1 and F2 are fixed to the grooved plate 12 by the respective end resin layers 23.

(Cover Plate 14)

The cover plate 14 is a rectangular plate-shaped member, and is made of, for example, metal, such as aluminum, whose surface is subjected to black alumite treatment. The cover plate 14 is provided on the grooved plate 12 so as to cover the groove 12a. A lower surface of the cover plate 14 is fixed (e.g., adhered) to the upper surface (part other than the groove 12a) of the grooved plate 12. This prevents external light from entering the groove 12a, and accordingly causes the groove 12a to be dark inside.

(Outputted Light Detecting Device 16 and Reflected Light Detecting Device 18, and Respective Positions of Outputted Light Detecting Device 16 and Reflected Light Detecting Device 18)

For measurement of power of light outputted from an end surface of the optical fiber F2 which end surface is located on a forward-propagating-light-output side, the outputted light detecting device 16 detects leaking light which is part of forward-propagating light that has propagated through the optical fiber F1 in an output direction. Note that the "forward-propagating-light-output side" means a side from which forward-propagating light is outputted, and the "output direction" means a direction in which forward-propagating light propagates so as to be away from a light source. Meanwhile, for measurement of power of reflected light which enters again the optical fiber F2 via the end surface of the optical fiber F2 which end surface is located on the forward-propagating-light-output side, the reflected light detecting device 18 detects leaking light which is part of backward-propagating light that has propagated through the optical fiber F2 in an input direction. Note here that the "reflected light" means light which has been outputted and then reflected by an irradiated object, and the "input direction" means a direction in which backward-propagating light propagates so as to be away from an irradiated object. Therefore, the outputted light detecting device 16 is provided at a position at which the outputted light detecting device 16 can detect light leaking from the side surface of the optical fiber F2, in a region extending in the output direction from an end of the low-refractive-index resin layer 20 which end is located on the forward-propagating-light-output side of the optical fiber F2. The reflected light detecting device 18 is provided at a position at which the reflected light detecting device 18 can detect light leaking from the side surface of the optical fiber F1, in a region extending in the input direction from an end of the low-refractive-index resin layer 20 which end is located on a forward-propagating-light-input side of the optical fiber F1. Note that the "forward-propagating-light-input side" means a side from which forward-propagating light is inputted, and is equivalent to a "backward-propagating-light-output side".

Figure 3:
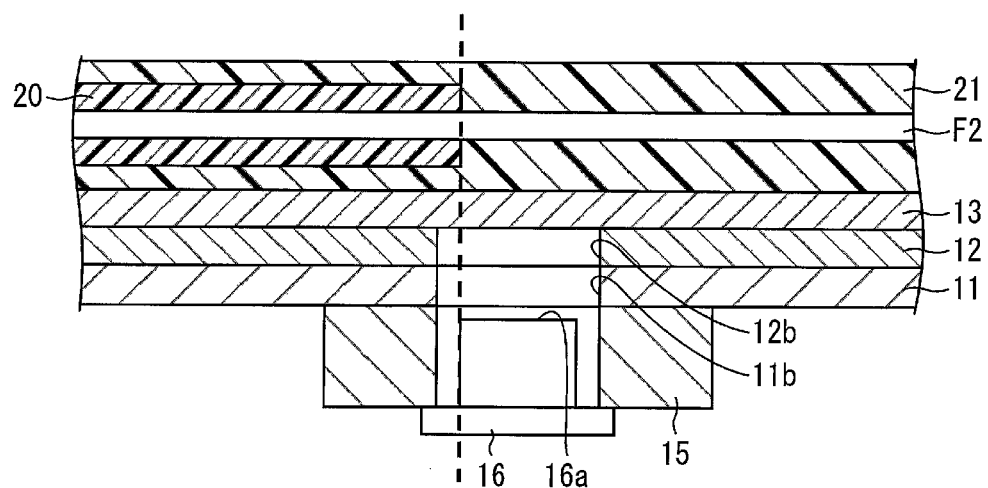
FIG. 3 is a cross-sectional view illustrating the light power monitoring device, taken along a line B-B' illustrated in FIG. 1.
Figure 4:
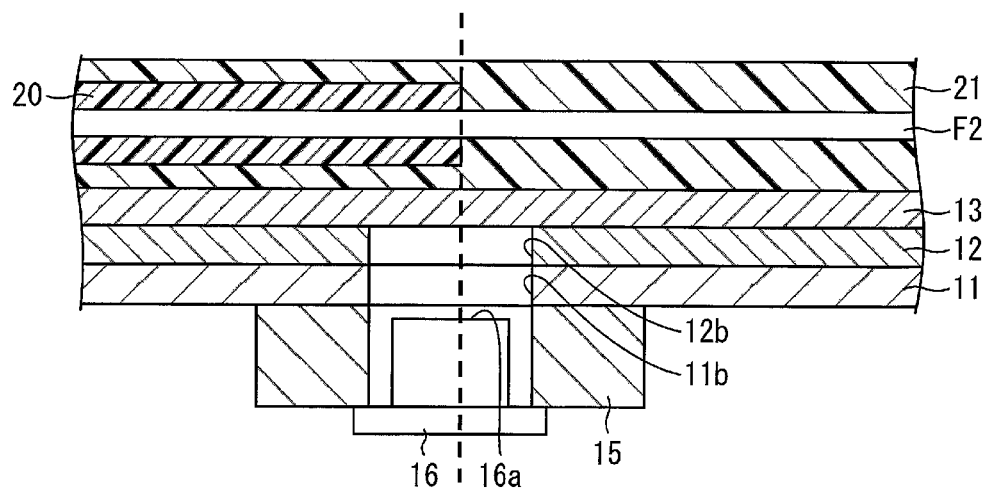
FIG. 4 is a cross-sectional view illustrating the light power monitoring device, taken along the line B-B' illustrated in FIG. 1.

Specifically, the outputted light detecting device 16 is provided at a position corresponding to the end of the low-refractive-index resin layer 20 which end is located on the forward-propagating-light-output side of the optical fiber F2 in the axial direction of the optical fibers F1 and F2. Alternatively, the outputted light detecting device 16 is provided at a position which is away toward the forward-propagating-light-output side of the optical fiber F2 from the position corresponding to the end of the low-refractive-index resin layer 20 which end is located on the forward-propagating-light-output side of the optical fiber F2 in the axial direction of the optical fibers F1 and F2. The position, corresponding to the end of the low-refractive-index resin layer 20 which end is located on the forward-propagating-light-output side of the optical fiber F2, of the outputted light detecting device 16 includes a position at which an end of a light receiving surface (light entering section) 16a of the outputted light detecting device 16 which end is located on a connection-19 side is in line with the end of the low-refractive-index resin layer 20 which end is located on the forward-propagating-light-output side of the optical fiber F2 in the axial direction of the optical fibers F1 and F2 (see FIG. 3). Further, the position, corresponding to the end of the low-refractive-index resin layer 20 which end is located on the forward-propagating-light-output side of the optical fiber F2, of the outputted light detecting device 16 includes a position at which at least part of the light receiving surface 16a of the outputted light detecting device 16 is in line with the end of the low-refractive-index resin layer 20 which end is located on the forward-propagating-light-output side of the optical fiber F2 in the axial direction of the optical fibers F1 and F2 (see FIG. 4). Note that FIGS. 3 and 4 are cross-sectional views each illustrating the light power monitoring device 1, taken along a line B-B' illustrated in FIG. 1.

Meanwhile, the reflected light detecting device 18 is provided at a position corresponding to the end of the low-refractive-index resin layer 20 which end is located on the forward-propagating-light-input side of the optical fiber F1 in the axial direction of the optical fibers F1 and F2. Alternatively, the reflected light detecting device 18 is provided at a position which is away toward the forward-propagating-light-input side of the optical fiber F1 from the position corresponding to the end of the low-refractive-index resin layer 20 which end is located on the forward-propagating-light-input side of the optical fiber F1 in the axial direction of the optical fibers F1 and F2. As with the case of the outputted light detecting device 16, the position, corresponding to the end of the low-refractive-index resin layer 20 which end is located on the forward-propagating-light-input side of the optical fiber F1, of the reflected light detecting device 18 includes a position at which an end of a light receiving surface (light entering section) of the reflected light detecting device 18 which end is located on the connection-19 side is in line with the end of the low-refractive-index resin layer 20 which end is located on the forward-propagating-light-input side of the optical fiber F1 in the axial direction of the optical fibers F1 and F2. Further, as with the case of the outputted light detecting device 16, the position, corresponding to the end of the low-refractive-index resin layer 20 which end is located on the forward-propagating-light-input side of the optical fiber F1, of the reflected light detecting device 18 includes a position at which at least part of the light receiving surface (light entering section) of the reflected light detecting device 18 is in line with the end of the low-refractive-index resin layer 20 which end is located on the forward-propagating-light-input side of the optical fiber F1 in the axial direction of the optical fibers F1 and F2.

Each of the outputted light detecting device 16 and the reflected light detecting device 18 can be an infrared photodiode.

In the present embodiment, the outputted light detecting device 16 is fixed to the base 11 via the fixing block 15, and the reflected light detecting device 18 is fixed to the base 11 via the fixing block 17 (see FIG. 1). The fixing blocks 15 and 17 can be each made of metal such as aluminum.

The base 11 and the grooved plate 12 have an opening 11b and an opening 12b, respectively, so that the outputted light detecting device 16 can receive light leaking from the optical fiber F2. In a case where the reinforced member 13 is not a light-permeable member, the reinforced member 13 similarly has an opening. Each of the base 11, the grooved plate 12, and the reinforced member 13 (in a case where the reinforced member 13 is not a light-permeable member) also has an opening at its position corresponding to the reflected light detecting device 18.

Note that, in the present embodiment, a lens 24 is particularly provided in front of each of the outputted light detecting device 16 and the reflected light detecting device 18 (see FIG. 2). This allows (i) the outputted light detecting device 16 to efficiently detect light leaking from the side surface of the optical fiber F2 and (ii) the reflected light detecting device 18 to efficiently detect light leaking from the side surface of the optical fiber F1.

Here, in the light power monitoring device 1, an example size of the low-refractive-index resin layer 20 and example arrangement of the outputted light detecting device 16 and the reflected light detecting device 18 are as follows. That is, the low-refractive-index resin layer 20 can have (i) a length of 10 mm from its center, corresponding to the connection 19, to its end located on an optical-fiber-F2 side (output side) and (ii) a length of 10 mm from its center, corresponding to the connection 19, to its end located on an optical-fiber-F1 side (input side). The position at which the outputted light detecting device 16 is provided and the position at which the reflected light detecting device 18 is provided can be each, for example, 20 mm away from the connection 19.

(Operation of Light Power Monitoring Device 1)

Figure 5:
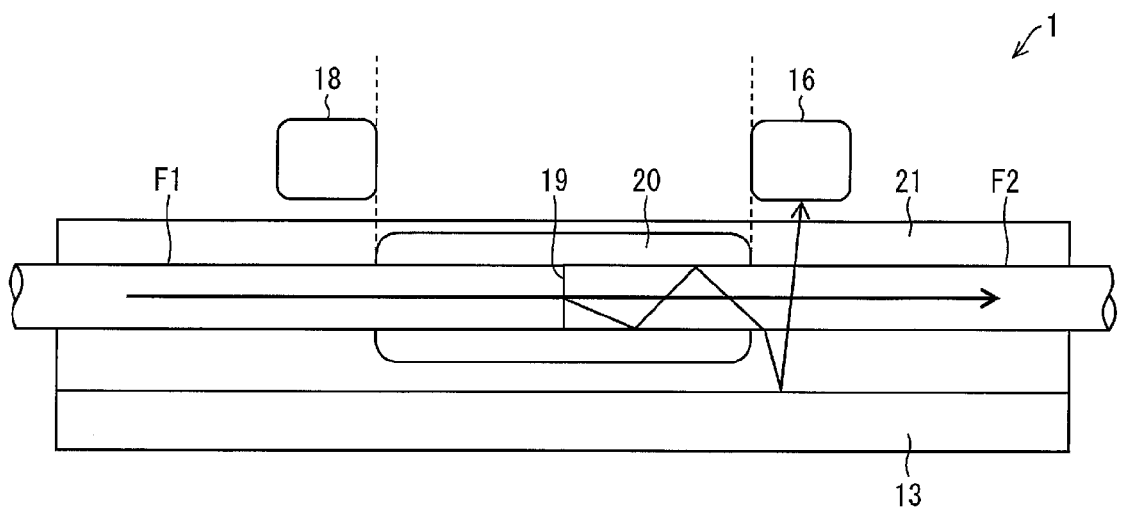
FIG. 5 is a view schematically illustrating a main part of the light power monitoring device illustrated in FIG. 1.

Operation of the light power monitoring device 1 having the above configuration will be described below. FIG. 5 is a view schematically illustrating a main part of the light power monitoring device 1 illustrated in FIG. 1. Note that FIG. 5 illustrates a state where the outputted light detecting device 16 and the reflected light detecting device 18 are provided at respective positions (positions above the optical fibers F1 and F2) opposite to those illustrated in FIG. 1 (positions below the optical fibers F1 and F2).

In FIG. 5, part of forward-propagating light which has propagated through a core of the optical fiber F1 enters the cladding of the optical fiber F2 from the connection 19. Further, part of backward-propagating light which has propagated through a core of the optical fiber F2 enters the cladding of the optical fiber F1 from the connection 19.

Here, the low-refractive-index resin layer 20, which has a refractive index lower than that of the cladding of each of the optical fibers F1 and F2, covers (i) the connection 19 between the optical fibers F1 and F2 and (ii) the respective regions of the optical fibers F1 and F2 which regions are located in the vicinity of the connection 19, that is, on the respective both sides of the connection 19. The optical fibers F1 and F2 thus have the respective regions which are covered by the low-refractive-index resin layer 20, and are further covered by the high-refractive-index resin layer 21, which has a refractive index equal to or higher than that of the cladding of each of the optical fibers F1 and F2.

According to the above configuration, most part (component incident on the low-refractive-index resin layer 20 at an angle greater than a critical angle) of forward-propagating light which has entered the cladding of the optical fiber F2 from the connection 19 propagates through the cladding of the optical fiber F2 without leaking from the vicinity of the connection 19 to the low-refractive-index resin layer 20.

That is, most part of forward-propagating light which has leaked from the connection 19 propagates without leaking from the region of the optical fiber F2 which region is covered by the low-refractive-index resin layer 20, and the most part of the forward-propagating light leaks from the region of the optical fiber F2 which region is not covered by the low-refractive-index resin layer 20 in a direction in which the forward-propagating light propagates. Such leaking light enters the high-refractive-index resin layer 21, and then enters the outputted light detecting device 16 directly or by being reflected by the reinforced member 13.

Note that part (component incident on the low-refractive-index resin layer 20 at an angle smaller than the critical angle) of the forward-propagating light which has entered the cladding of the optical fiber F2 from the connection 19 leaks from the vicinity of the connection 19 to the low-refractive-index resin layer 20. Such leaking forward-propagating light hardly enters the reflected light detecting device 18 which is provided away from the connection 19.

Similarly, most part (component incident on the low-refractive-index resin layer 20 at an angle greater than a critical angle) of backward-propagating light which has entered the cladding of the optical fiber F1 from the connection 19 propagates through the cladding of the optical fiber F1 without leaking from the vicinity of the connection 19 to the low-refractive-index resin layer 20.

That is, most part of backward-propagating light which has leaked from the connection 19 propagates without leaking from the region of the optical fiber F1 which region is covered by the low-refractive-index resin layer 20, and the most part of the backward-propagating light leaks from the region of the optical fiber F1 which region is not covered by the low-refractive-index resin layer 20 in a direction in which the backward-propagating light propagates. Such leaking light enters the high-refractive-index resin layer 21, and then enters the reflected light detecting device 18 directly or by being reflected by the reinforced member 13.

Note that part (component incident on the low-refractive-index resin layer 20 at an angle smaller than the critical angle) of the backward-propagating light which has entered the cladding of the optical fiber F1 from the connection 19 leaks from the vicinity of the connection 19 to the low-refractive-index resin layer 20. Such leaking backward-propagating light hardly enters the outputted light detecting device 16 which is provided away from the connection 19.

(Advantage of Light Power Monitoring Device 1)

According to the light power monitoring device 1, as has been described, the low-refractive-index resin layer 20, which has a refractive index lower than that of the cladding of each of the optical fibers F1 and F2, covers (i) the connection 19 between the optical fibers F1 and F2 and (ii) the respective regions of the optical fibers F1 and F2 which regions are located in the vicinity of the connection 19, that is, on the respective both sides of the connection 19 (region extending in a predetermined range from the connection 19).

Further, the outputted light detecting device 16 is provided at (i) the position corresponding to the end of the low-refractive-index resin layer 20 which end is located on the forward-propagating-light-output side of the optical fiber F2 in the axial direction of the optical fibers F1 and F2 or (ii) the position which is away toward the forward-propagating-light-output side of the optical fiber F2 from the position corresponding to the end of the low-refractive-index resin layer 20 which end is located on the forward-propagating-light-output side of the optical fiber F2 in the axial direction of the optical fibers F1 and F2. Meanwhile, the reflected light detecting device 18 is provided at (i) the position corresponding to the end of the low-refractive-index resin layer 20 which end is located on the forward-propagating-light-input side of the optical fiber F1 in the axial direction of optical fibers F1 and F2 or (ii) the position which is away toward the forward-propagating-light-input side of the optical fiber F1 from the position corresponding to the end of the low-refractive-index resin layer 20 which end is located on the forward-propagating-light-input side of the optical fiber F1 in the axial direction of optical fibers F1 and F2. That is, the outputted light detecting device 16 and the reflected light detecting device 18 are provided at respective positions each of which is away from the connection 19 between the optical fibers F1 and F2.

Therefore, backward-propagating light (including direct light and scattered light) which has leaked from the connection 19 is not easily received by the outputted light detecting device 16. This makes it possible to prevent a situation, such that a measurement result indicates that outputted light has power greater than actual power, resulting from the backward-propagating light. Furthermore, the outputted light detecting device 16 is capable of receiving leaking forward-propagating light with desired ability. This makes it possible to avoid an adverse effect of noise during detection of power of outputted light. It is therefore possible to accurately measure power of outputted light.

Similarly, forward-propagating light (including direct light and scattered light) which has leaked from the connection 19 is not easily received by the reflected light detecting device 18. This makes it possible to prevent a situation, such that a measurement result indicates that reflected light has power greater than actual power or such that reflected light is detected even in a case where no reflected light exists, resulting from the forward-propagating light. Furthermore, the reflected light detecting device 18 is capable of receiving leaking backward-propagating light with desired ability. This makes it possible to avoid an adverse effect of noise during detection of power of reflected light. It is therefore possible to accurately measure power of reflected light.

Figure 6:
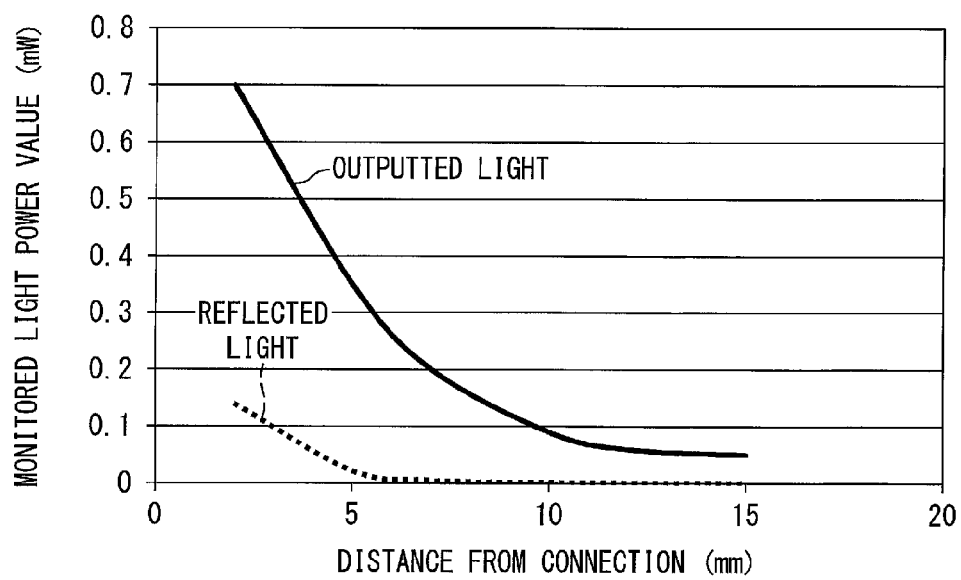
FIG. 6 is a graph illustrating (a) a relationship between (i) a distance from the connection between the optical fibers to the outputted light detecting device and (ii) a light power monitored value obtained from the outputted light detecting device and (b) a relationship between (i) a distance from the connection between the optical fibers to a reflected light detecting device and (ii) a light power monitored value obtained from the reflected light detecting device. Those relationships are ones that are observed in a case where the low-refractive-index resin layer is not provided to the light power monitoring device illustrated in FIG. 5.
Figure 7:
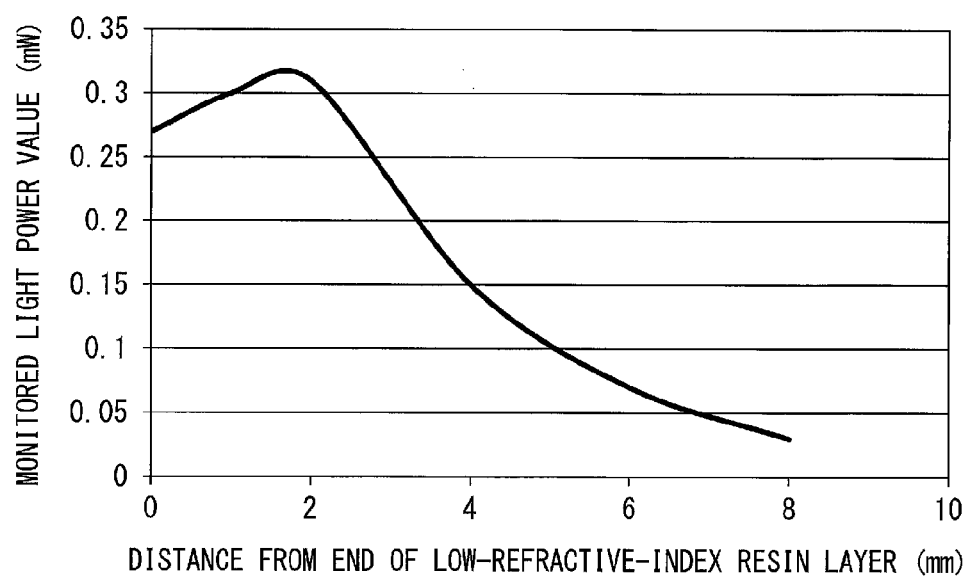
FIG. 7 is a graph illustrating a relationship, between (i) a distance from the end of the low-refractive-index resin layer which end is located on an outputted-light-detecting-device side, to the outputted light detecting device and (ii) a light power monitored value obtained from the outputted light detecting device, observed in the light power monitoring device illustrated in FIG. 5.

Here, FIG. 6 illustrates measurement results of (a) a relationship between (i) a distance from the connection 19 to the outputted light detecting device 16 (distance in the axial direction of the optical fibers F1 and F2) and (ii) a light power monitored value obtained from the outputted light detecting device 16 (that is, a degree of power of light detected by the outputted light detecting device 16) and (b) a relationship between (i) a distance from the connection 19 to the reflected light detecting device 18 (distance in the axial direction of the optical fibers F1 and F2) and (ii) a light power monitored value obtained from the reflected light detecting device 18 (that is, a degree of power of light detected by the reflected light detecting device 18). The measurement results are ones that are obtained in a case where the low-refractive-index resin layer 20 is not provided. FIG. 7 illustrates a measurement result of a relationship between (i) a distance from the end of the low-refractive-index resin layer 20 which end is located on an outputted-light-detecting-device-16 side, to the outputted light detecting device 16 (distance from the end of the low-refractive-index resin layer 20 which end is located on the outputted-light-detecting-device-16 side, to an end of the outputted light detecting device 16 which end is located on a low-refractive-index-resin-layer-20 side) and (ii) a light power monitored value obtained from the outputted light detecting device 16. Note that, in FIG. 6, light power monitored values, obtained under conditions that the above distances from the connection 19 are each in a range of approximately 0 (zero) mm to 2.5 mm, are omitted. In regard to the above range, although light similarly has power, values of the power of the light are merely omitted.

As illustrated in FIG. 6, in a case where the low-refractive-index resin layer 20 is not provided, power of outputted light detected by the outputted light detecting device 16 and power of reflected light detected by the reflected light detecting device 18 each become lower, as the distance from the connection 19 to the outputted light detecting device 16 and the distance from the connection 19 to the reflected light detecting device 18 (distance from the connection 19 to a center of each of the outputted light detecting device 16 and the reflected light detecting device 18) each become longer. Therefore, it is found from FIG. 6 that the outputted light detecting device 16 and the reflected light detecting device 18 are each preferably provided away from the connection 19 in the axial direction of the optical fibers F1 and F2 so as to reduce an effect of power of reflected light on a detected value of power of outputted light and to reduce an effect of power of outputted light on a detected value of power of reflected light. Meanwhile, in a case where the outputted light detecting device 16 and the reflected light detecting device 18 are each provided away from the connection 19 in the axial direction of the optical fibers F1 and F2, a measured value of power of outputted light which should be essentially detected by the outputted light detecting device 16 and a measured value of power of reflected light which should be essentially detected by the reflected light detecting device 18 each become lower.

In view of the above, the low-refractive-index resin layer 20 is provided so as to cover (i) the connection 19 between the optical fibers F1 and F2 and (ii) the respective regions of the optical fibers F1 and F2 which regions are located in the vicinity of the connection 19, that is, on the respective both sides of the connection 19, and the outputted light detecting device 16 and the reflected light detecting device 18 are provided at respective positions corresponding to the ends of the low-refractive-index resin layer 20 (or provided at respective positions which are away from the positions corresponding to the ends of the low-refractive-index resin layer 20). This causes forward-propagating light and backward-propagating light to propagate to the respective ends of the low-refractive-index resin layer 20 without leaking between the connection 19 and the respective ends of the low-refractive-index resin layer 20. It is therefore possible to detect the forward-propagating light and the backward-propagating light with desired ability.

As is clear from the measurement result illustrated in FIG. 7, power of outputted light detected by the outputted light detecting device 16 has the largest value, in a case where the position of the outputted light detecting device 16 (position of the end of the outputted light detecting device 16 which end is located on the connection-19 side) is 2 mm away from the end of the low-refractive-index resin layer 20 which end is located on the outputted-light-detecting-device-16 side. As the outputted light detecting device 16 becomes farther away from the end of the low-refractive-index resin layer 20 which end is located on the outputted-light-detecting-device-16 side, the power of the outputted light becomes lower. It is therefore found that the outputted light detecting device 16 is preferably provided at a position in a vicinity of the end of the low-refractive-index resin layer 20 (including the position corresponding to the end of the low-refractive-index resin layer 20) which end is located on the outputtedlight-detecting-device-16 side. The same applies to the reflected light detecting device 18.

Note that, as has been described, the light power monitoring device 1 is configured such that the low-refractive-index resin layer 20 covers (i) the connection 19 between the optical fibers F1 and F2 and (ii) the respective regions of the optical fibers F1 and F2 which regions are located in the vicinity of the connection 19, that is, on the respective both sides of the connection 19. Furthermore, the light power monitoring device 1 is configured so as to include the outputted light detecting device 16 and the reflected light detecting device 18. However, the light power monitoring device 1 can be alternatively configured so as to merely include any one of the outputted light detecting device 16 and the reflected light detecting device 18.

That is, the light power monitoring device 1 can be configured so as to merely include the outputted light detecting device 16 and to merely measure power of outputted light. In this case, the low-refractive-index resin layer 20 only needs to cover (i) the connection 19 between the optical fibers F1 and F2 and (ii) the region of the optical fiber F2 which region is located in the vicinity of the connection 19, that is, on the forward-propagating-light-output side of the connection 19. Similarly, the light power monitoring device 1 can be alternatively configured so as to merely include the reflected light detecting device 18 and to merely measure power of reflected light. In this case, the low-refractive-index resin layer 20 only needs to cover (i) the connection 19 between the optical fibers F1 and F2 and (ii) the region of the optical fiber F1 which region is located in the vicinity of the connection 19, that is, on the forward-propagating-light-input side of the connection 19.

[Fiber Laser]

Figure 8:
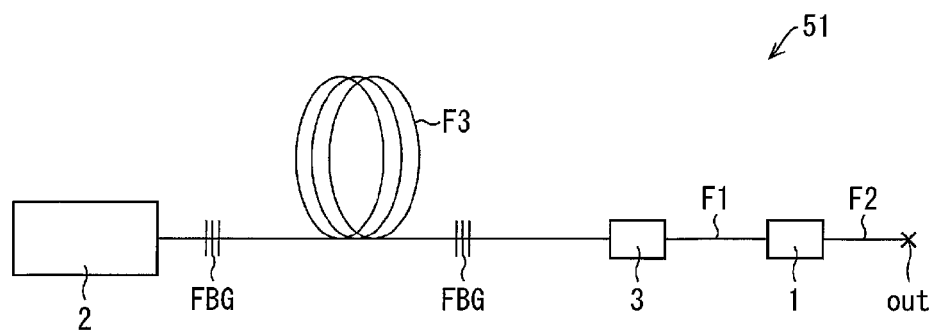
FIG. 8 is a block diagram illustrating a configuration of a fiber laser including the light power monitoring device illustrated in FIG. 1.
Figure 9:
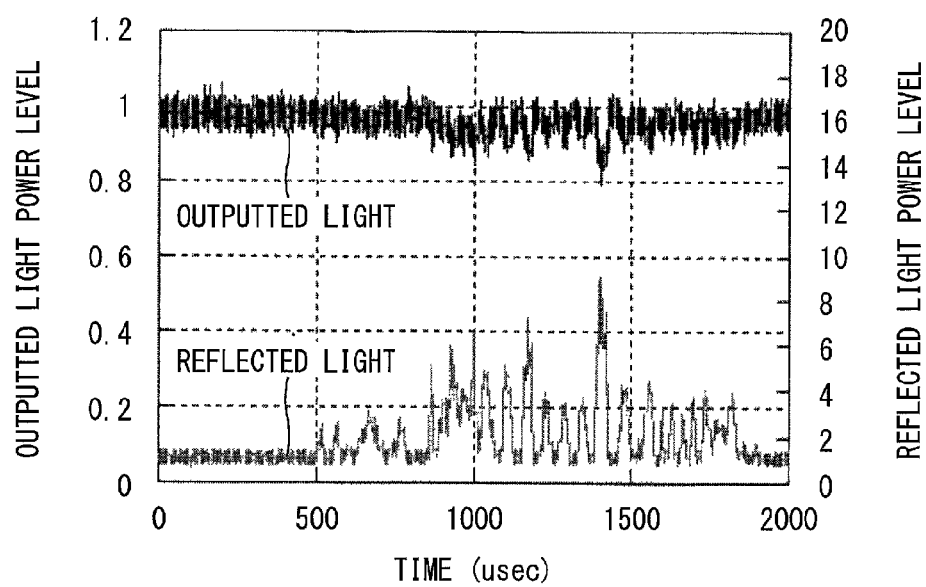
FIG. 9 is a graph illustrating a relationship, between (i) power of light reflected by an object irradiated with laser light and (ii) power of outputted light, observed in a conventional fiber laser.
Figure 10:
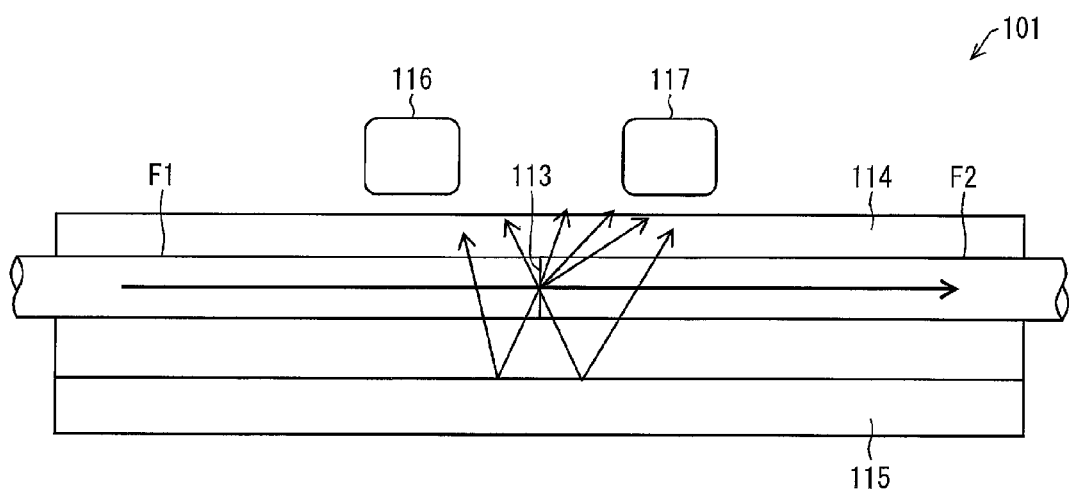
FIG. 10 is a view schematically illustrating a main part of a conventional light power monitoring device.
Figure 11:
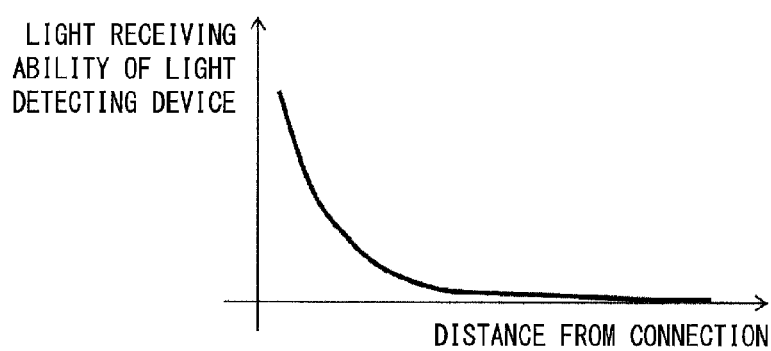
FIG. 11 is a graph illustrating a relationship, between (i) a distance from a connection to a light detecting device and (ii) ability of the light detecting device to receive light, observed in the conventional light power monitoring device illustrated in FIG. 10.

A fiber laser 51 including the light power monitoring device 1 will be described below. FIG. 8 is a block diagram illustrating a configuration of the fiber laser 51.

As illustrated in FIG. 8, the fiber laser 51 includes the light power monitoring device 1, a light source device 2, an optical fiber F3 (upstream optical fiber), a residual light removing section 3, and the optical fibers F1 and F2 (downstream optical fibers).

The optical fiber F3 functions as an amplification medium. The optical fiber F3 is a double-cladding fiber and includes (i) a core to which an active element is added, (ii) an inner cladding surrounding the core, and (iii) an outer cladding surrounding the inner cladding. The active element added to the core of the optical fiber F3 is transferred to a state of population inversion by excitation light which has been outputted from the light source device 2 and which propagates through the inner cladding of the optical fiber F3. Forward-propagating light which has been outputted from the light source device 2 and which propagates through the core of the optical fiber F3 is amplified by the active element transferred to the state of population inversion. In particular, two fiber Bragg gratings (FBGs) are written in the optical fiber F3, and the forward-propagating light which propagates through the core of the optical fiber F3 is recursively amplified between the two fiber Bragg gratings (FBGs).

The residual light removing section 3 removes residual light from forward-propagating light which propagates through the optical fiber F3. Note that residual light indicates light, other than forward-propagating light which propagates through a core, such as: excitation light which propagates through an inner cladding; and forward-propagating light which leaks to a cladding due to incorrect alignment between end surfaces, spliced together by fusion, of optical fibers.

The forward-propagating light outputted from the residual light removing section 3 propagates through the optical fibers F1 and F2 each functioning as a transmission medium, and is outputted outside from an output end "out." The light power monitoring device 1 in accordance with the present embodiment is provided between the optical fibers F1 and F2. By thus employing a configuration in which the light power monitoring device 1 is provided on an output-end-"out" side of the residual light removing section 3, it is possible to monitor intensity of forward-propagating light which propagates through a core, without being affected by residual light which propagates through a cladding.

During detection of power of outputted light, the light power monitoring device 1 outputs a photocurrent which varies depending on power of light leaking from the optical fiber F2. The power of the light leaking from the optical fiber F2 is proportional to power of light outputted from the output end "out" (hereinafter, also referred to as "fiber laser output"). Therefore, it is possible to specify the fiber laser output by converting the photocurrent, outputted from the light power monitoring device 1, into a voltage.

Note that, in the above embodiment, light leaking from the cladding of each of the optical fibers F1 and F2 is caused to directly enter a corresponding one of the outputted light detecting device 16 and the reflected light detecting device 18. Alternatively, light leaking from the cladding of each of the optical fibers F1 and F2 can be caused to enter a corresponding one of monitoring optical fibers and then enter a corresponding one of the outputted light detecting device 16 and the reflected light detecting device 18 via the corresponding one of the monitoring optical fibers. In this case, each of the monitoring optical fibers is provided so that an end of the each of the monitoring optical fibers, which end serves as a light entering section, is located at a position corresponding to a corresponding one of the outputted light detecting device and the reflected light detecting device 18. A light detecting section is constituted by a monitoring optical fiber and a light detecting device.

SUMMARY

A light power monitoring device of the present invention is a light power monitoring device for measuring power of light leaking from a side surface of an optical fiber with use of a light detecting section, including: a first optical fiber; a second optical fiber which is connected to the first optical fiber and which is located on a forward-propagating-light-output side of the first optical fiber, the forward-propagating-light-output side of the first optical fiber being a side from which forward-propagating light is outputted; a low-refractive-index resin layer which covers (i) a connection between the first and the second optical fibers and (ii) a region of the second optical fiber which region extends in a predetermined range from the connection, the low-refractive-index resin layer having a refractive index lower than that of a cladding of the second optical fiber; a high-refractive-index resin layer which covers at least a region of the second optical fiber which region is not covered by the low-refractive-index resin layer, the high-refractive-index resin layer having a refractive index equal to or higher than that of the cladding of the second optical fiber; and the light detecting section which has a light entering section and which detects light that has leaked from the cladding of the second optical fiber and has entered the light detecting section via the light entering section through the high-refractive-index-region layer, the light detecting section being provided so that the light entering section is located, in an axial direction of the first and the second optical fibers, at a position corresponding to an end of the low-refractive-index resin layer which end is located on a forward-propagating-light-output side (side to which the forward-propagating light propagates) of the second optical fiber or at a position which is away toward the forward-propagating-light-output side of the second optical fiber from the position corresponding to the end of the low-refractive-index resin layer, the forward-propagating-light-output side of the second optical fiber being a side from which the forward-propagating light is outputted.

According to the above configuration, the connection between the first and the second optical fibers is covered by the low-refractive-index resin layer having a refractive index lower than that of the cladding of the second optical fiber. Therefore, most part (component incident on the low-refractive-index resin layer at an angle greater than a critical angle) of forward-propagating light which has leaked at the connection from a core of the first optical fiber to the cladding of the second optical fiber propagates through the cladding of the second optical fiber without leaking from part of the cladding of the second optical fiber which part is located in a vicinity of the connection.

Furthermore, according to the above configuration, the region of the second optical fiber which region is not covered by the low-refractive-index resin layer is covered by the high-refractive-index resin layer having a refractive index equal to or higher than that of the cladding of the second optical fiber. Therefore, the most part of the forward-propagating light propagates through the cladding of the second optical fiber without leaking from the part of the cladding of the second optical fiber which part is located in the vicinity of the connection, and leaks to the high-refractive-index resin layer from part of the cladding of the second optical fiber which part is the region that is not covered by the low-refractive-index resin layer.

Moreover, according to the above configuration, the light detecting section is provided so that the light entering section is located, in the axial direction of the first and the second optical fibers, at the position corresponding to the end of the low-refractive-index resin layer which end is located on the forward-propagating-light-output side of the second optical fiber or at the position which is away toward the forward-propagating-light-output side of the second optical fiber from the position corresponding to the end of the low-refractive-index resin layer. Therefore, the most part of the forward-propagating light leaks to the high-refractive-index resin layer from the part of the cladding of the second optical fiber which part is the region that is not covered by the low-refractive-index resin layer, and sufficiently enters the light detecting section.

Therefore, even in a case where the light detecting section is provided so that the light entering section is located away from the connection between the first and the second optical fibers, the light entering section is capable of sufficiently receiving the most part of the forward-propagating light which has leaked at the connection from the core of the first optical fiber to the cladding of the second optical fiber. This makes it possible to avoid an adverse effect of noise during measurement of power of outputted light.

Besides, the light detecting section is provided so that the light entering section is located, in the axial direction of the first and the second optical fibers, at the position corresponding to the end of the low-refractive-index resin layer which end is located on the forward-propagating-light-output side (a side to which forward-propagating light propagates) of the second optical fiber or at the position which is away toward the forward-propagating-light-output side of the second optical fiber from the position corresponding to the end of the low-refractive-index resin layer. Therefore, even in a case where part (component incident on the low-refractive-index resin layer at an angle smaller than the critical angle) of backward-propagating light which has leaked at the connection from a core of the second optical fiber to a cladding of the first optical fiber leaks from part of the cladding of the first optical fiber which part is located in the vicinity of the connection, the part of the backward-propagating light and scattered light, caused by the part of the backward-propagating light being scattered by a surrounding member, are not easily received by the light detecting section.

It is therefore possible to prevent a situation, such that a measurement result indicates that outputted light has power greater than actual power, resulting from the part of the backward-propagating light. As a result, it is possible to accurately measure power of outputted light.

A light power monitoring method of the present invention is a light power monitoring method for measuring power of light leaking from a side surface of an optical fiber with use of a light detecting section, including the steps of: covering (i) a connection between a first optical fiber and a second optical fiber which is located on a forward-propagating-light-output side of the first optical fiber and (ii) a region of the second optical fiber which region extends in a predetermined range from the connection, with a low-refractive-index resin layer having a refractive index lower than that of a cladding of the second optical fiber, the forward-propagating-light-output side of the first optical fiber being a side from which forward-propagating light is outputted; covering at least a region of the second optical fiber which region is not covered by the low-refractive-index resin layer, with a high-refractive-index resin layer having a refractive index equal to or higher than that of the cladding of the second optical fiber; and providing a light detecting section, having a light entering section, so that the light entering section is located, in an axial direction of the first and the second optical fibers, at a position corresponding to an end of the low-refractive-index resin layer which end is located on a forward-propagating-light-output side (side to which the forward-propagating light propagates) of the second optical fiber or at a position which is away toward the forward-propagating-light-output side of the second optical fiber from the position corresponding to the end of the low-refractive-index resin layer, and detecting, with use of the light detecting section, light which has leaked from the cladding of the second optical fiber and has entered the light detecting section via the light entering section through the high-refractive-index-region layer, the forward-propagating-light-output side of the second optical fiber being a side from which the forward-propagating light is outputted.

According to the above configuration, it is possible to bring about an effect similar to that brought about by the above light power monitoring device.

A light power monitoring device of the present invention is a light power monitoring device for measuring power of light leaking from a side surface of an optical fiber with use of a light detecting section, including: a first optical fiber; a second optical fiber which is connected to the first optical fiber and which is located on a forward-propagating-light-output side of the first optical fiber, the forward-propagating-light-output side of the first optical fiber being a side from which forward-propagating light is outputted; a low-refractive-index resin layer which covers (i) a connection between the first and the second optical fibers and (ii) a region of the first optical fiber which region extends in a predetermined range from the connection, the low-refractive-index resin layer having a refractive index lower than that of a cladding of the first optical fiber; a high-refractive-index resin layer which covers at least a region of the first optical fiber which region is not covered by the low-refractive-index resin layer, the high-refractive-index resin layer having a refractive index equal to or higher than that of the cladding of the first optical fiber; and the light detecting section which has a light entering section and which detects light that has leaked from the cladding of the first optical fiber and has entered the light detecting section via the light entering section through the high-refractive-index-region layer, the light detecting section being provided so that the light entering section is located, in an axial direction of the first and the second optical fibers, at a position corresponding to an end of the low-refractive-index resin layer which end is located on a forward-propagating-light-input side (side opposite to a side to which the forward-propagating light propagates) of the first optical fiber or at a position which is away toward the forward-propagating-light-input side of the first optical fiber from the position corresponding to the end of the low-refractive-index resin layer, the forward-propagating-light-input side of the first optical fiber being a side from which the forward-propagating light is inputted.

According to the above configuration, the connection between the first and the second optical fibers is covered by the low-refractive-index resin layer having a refractive index lower than that of the cladding of the first optical fiber. Therefore, most part (component incident on the low-refractive-index resin layer at an angle greater than a critical angle) of backward-propagating light which has leaked at the connection from a core of the second optical fiber to the cladding of the first optical fiber propagates through the cladding of the first optical fiber without leaking from part of the cladding of the first optical fiber which part is located in a vicinity of the connection.

Furthermore, according to the above configuration, the region of the first optical fiber which region is not covered by the low-refractive-index resin layer is covered by the high-refractive-index resin layer having a refractive index equal to or higher than that of the cladding of the first optical fiber. Therefore, the most part of the backward-propagating light propagates through the cladding of the first optical fiber without leaking from the part of the cladding of the first optical fiber which part is located in the vicinity of the connection, and leaks to the high-refractive-index resin layer from part of the cladding of the first optical fiber which part is the region that is not covered by the low-refractive-index resin layer.

Moreover, according to the above configuration, the light detecting section is provided so that the light entering section is located, in the axial direction of the first and the second optical fibers, at the position corresponding to the end of the low-refractive-index resin layer which end is located on the forward-propagating-light-input side (backward-propagating-light-output side) of the first optical fiber or at the position which is away toward the forward-propagating-light-input side of the first optical fiber from the position corresponding to the end of the low-refractive-index resin layer. Therefore, the most part of the backward-propagating light leaks to the high-refractive-index resin layer from the part of the cladding of the first optical fiber which part is the region that is not covered by the low-refractive-index resin layer, and sufficiently enters the light detecting section.

Therefore, even in a case where the light detecting section is provided so that the light entering section is located away from the connection between the first and the second optical fibers, the light entering section is capable of sufficiently receiving the most part of the backward-propagating light which has leaked at the connection from the core of the second optical fiber to the cladding of the first optical fiber. This makes it possible to avoid an adverse effect of noise during measurement of power of reflected light.

Besides, the light detecting section is provided so that the light entering section is located, in the axial direction of the first and the second optical fibers, at the position corresponding to the end of the low-refractive-index resin layer which end is located on the forward-propagating-light-input side (a side opposite to a side to which forward-propagating light propagates) of the first optical fiber or at the position which is away toward the forward-propagating-light-input side of the first optical fiber from the position corresponding to the end of the low-refractive-index resin layer. Therefore, even in a case where part (component incident on the low-refractive-index resin layer at an angle smaller than the critical angle) of forward-propagating light which has leaked at the connection from a core of the first optical fiber to a cladding of the second optical fiber leaks from part of the cladding of the second optical fiber which part is located in the vicinity of the connection, the part of the forward-propagating light and scattered light, caused by the part of the forward-propagating light being scattered by a surrounding member, are not easily received by the light detecting section.

It is therefore possible to prevent a situation, such that a measurement result indicates that reflected light has power greater than actual power or such that reflected light is detected even in a case where no reflected light exists, resulting from the part of the forward-propagating light. As a result, it is possible to accurately measure power of reflected light.

A light power monitoring method of the present invention is a light power monitoring method for measuring power of light leaking from a side surface of an optical fiber with use of a light detecting section, including the steps of: covering (i) a connection between a first optical fiber and a second optical fiber, the first optical fiber being located on a forward-propagating-light-input side of the second optical fiber, and (ii) a region of the first optical fiber which region extends in a predetermined range from the connection, with a low-refractive-index resin layer having a refractive index lower than that of a cladding of the first optical fiber, the forward-propagating-light-input side of the second optical fiber being a side from which forward-propagating light is inputted; covering at least a region of the first optical fiber which region is not covered by the low-refractive-index resin layer, with a high-refractive-index resin layer having a refractive index equal to or higher than that of the cladding of the first optical fiber; and providing a light detecting section, having a light entering section, so that the light entering section is located, in an axial direction of the first and the second optical fibers, at a position corresponding to an end of the low-refractive-index resin layer which end is located on a forward-propagating-light-input side (side opposite to a side to which the forward-propagating light propagates) of the first optical fiber or at a position which is away toward the forward-propagating-light-input side of the first optical fiber from the position corresponding to the end of the low-refractive-index resin layer, and detecting, with use of the light detecting section, light which has leaked from the cladding of the first optical fiber and has entered the light detecting section via the light entering section through the high-refractive-index-region layer, the forward-propagating-light-input side of the first optical fiber being a side from which the forward-propagating light is inputted.

According to the above configuration, it is possible to bring about an effect similar to that brought about by the above light power monitoring device.

A light power monitoring device of the present invention is a light power monitoring device for measuring power of light leaking from a side surface of an optical fiber with use of a light detecting section, including: a first optical fiber; a second optical fiber which is connected to the first optical fiber and which is located on a forward-propagating-light-output side of the first optical fiber, the forward-propagating-light-output side of the first optical fiber being a side from which forward-propagating light is outputted; a low-refractive-index resin layer which covers (i) a connection between the first and the second optical fibers and (ii) respective regions of the first and the second optical fibers which regions extend in respective predetermined ranges from the connection, the low-refractive-index resin layer having a refractive index lower than that of a cladding of each of the first and the second optical fibers; a high-refractive-index resin layer which covers at least respective regions of the first and the second optical fibers which regions are not covered by the low-refractive-index resin layer, the high-refractive-index resin layer having a refractive index equal to or higher than that of the cladding of the each of the first and the second optical fibers; a first light detecting section which has a light entering section and which detects light that has leaked from the cladding of the second optical fiber and has entered the first light detecting section via the light entering section of the first light detecting section through the high-refractive-index-region layer; and a second light detecting section which has a light entering section and which detects light that has leaked from the cladding of the first optical fiber and has entered the second light detecting section via the light entering section of the second light detecting section through the high-refractive-index-region layer, the first light detecting section being provided so that the light entering section of the first light detecting section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer which end is located on the forward-propagating-light-output side of the second optical fiber, the forward-propagating-light-output side of the second optical fiber being a side from which the forward-propagating light is outputted, the second light detecting section being provided so that the light entering section of the second light detecting section is located, in the axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer which end is located on the forward-propagating-light-input side of the first optical fiber, the forward-propagating-light-input side of the first optical fiber being a side from which the forward-propagating light is inputted.

According to the above configuration, as with the case of the foregoing light power monitoring devices, it is possible to prevent a situation, such that a measurement result indicates that outputted light has power greater than actual power, resulting from backward-propagating light which has leaked. As a result, it is possible to accurately measure power of outputted light.

A light power monitoring method of the present invention is a light power monitoring method for measuring power of light leaking from a side surface of an optical fiber with use of a light detecting section, including the steps of: covering (i) a connection between a first optical fiber and a second optical fiber which is located on a forward-propagating-light-output side of the first optical fiber and (ii) respective regions of the first and the second optical fibers which regions extend in respective predetermined ranges from the connection, with a low-refractive-index resin layer having a refractive index lower than that of a cladding of each of the first and the second optical fibers, the forward-propagating-light-output side of the first optical fiber being a side from which forward-propagating light is outputted; covering at least respective regions of the first and the second optical fibers which regions are not covered by the low-refractive-index resin layer, with a high-refractive-index resin layer having a refractive index equal to or higher than that of the cladding of the each of the first and the second optical fibers; providing a first light detecting section, having a light entering section, so that the light entering section of the first light detecting section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer which end is located on the forward-propagating-light-output side of the second optical fiber, and detecting, with use of the first light detecting section, light which has leaked from the cladding of the second optical fiber and has entered the first light detecting section via the light entering section of the first light detecting section through the high-refractive-index-region layer, the forward-propagating-light-output side of the second optical fiber being a side from which the forward-propagating light is outputted; and providing a second light detecting section having a light entering section so that the light entering section of the second light detecting section is located, in the axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer which end is located on the forward-propagating-light-input side of the first optical fiber, and detecting, with use of the second light detecting section, light which has leaked from the cladding of the first optical fiber and has entered the second light detecting section via the light entering section of the second light detecting section through the high-refractive-index-region layer, the forward-propagating-light-input side of the first optical fiber being a side from which the forward-propagating light is inputted.

According to the above configuration, it is possible to bring about an effect similar to that brought about by the above light power monitoring device.

The light power monitoring device can be arranged so as to further include a reinforced member, the high-refractive-index resin layer covering the low-refractive-index resin layer and being provided in the reinforced member, part of the reinforced member which part faces the low-refractive-index resin layer via the high-refractive-index resin layer is a light absorbing part, part of the reinforced member which part does not face the low-refractive-index resin layer via the high-refractive-index resin layer is a light reflecting part.

According to the above configuration, the reinforced member is capable of absorbing, by its light absorbing part, unnecessary light around the low-refractive-index resin layer (for example, light leaking from the connection between the first and the second optical fibers). Furthermore, the reinforced member is capable of reflecting, by its light reflecting part, light leaking from the region of the first or the second optical fiber which region is not covered by the low-refractive-index resin layer, thereby causing more such leaking light to enter the light detecting section. This allows an increase in detection accuracy of the light power monitoring device.

Note that the scope of the present invention also encompasses a fiber laser configured such that the light power monitoring device in accordance with the present invention is provided between downstream optical fibers each functioning as a transmission medium. According to the fiber laser, it is possible to more accurately measure power of outputted light, as compared with a conventional one. Therefore, for example, it is possible to more accurately carry out feedback control with respect to outputted light, as compared with the conventional one.

The present invention is not limited to the description of the foregoing embodiment, but may be altered within the scope of the claims. That is, an embodiment derived from a combination of technical means altered appropriately within the scope of the claims is also encompassed in the technical scope of the present invention.

INDUSTRIAL APPLICABILITY

The present invention can be suitably used as a light power monitoring device included in a fiber laser, a fiber amplifier, or the like. The present invention can be also suitably used as a fiber laser for processing a material in which fiber laser reflected light often occurs.

REFERENCE SIGNS LIST

1 Light power monitoring device
12 Grooved plate
12a Groove
13 Reinforced member
13a Groove
16 Outputted light detecting device (light detecting section, first light detecting section)
16a Light receiving surface (light entering section)
18 Reflected light detecting device (light detecting section, second light detecting section)
19 Connection
20 Low-refractive-index resin layer
21 High-refractive-index resin layer
51 Fiber laser
F1 Optical fiber (first optical fiber)
F2 Optical fiber (second optical fiber)
F3 Optical fiber

The invention claimed is:

1. A light power monitoring device for measuring power of light leaking from a side surface of an optical fiber with use of a light detecting section, comprising:

a first optical fiber;
a second optical fiber which is connected to the first optical fiber and which is located on a forward-propagating-light-output side of the first optical fiber, the forward-propagating-light-output side of the first optical fiber being a side from which forward-propagating light is outputted;
a low-refractive-index resin layer which covers (i) a connection between the first and the second optical fibers and (ii) a region of the second optical fiber which region extends in a predetermined range from the connection, the low-refractive-index resin layer having a refractive index lower than that of a cladding of the second optical fiber;
a high-refractive-index resin layer which covers at least a region of the second optical fiber which region is not covered by the low-refractive-index resin layer, the high-refractive-index resin layer having a refractive index equal to or higher than that of the cladding of the second optical fiber; and
the light detecting section which has a light entering section and which detects light that has leaked from the cladding of the second optical fiber and has entered the light detecting section via the light entering section through the high-refractive-index-region layer,
the light detecting section being provided so that the light entering section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer, the forward-propagating-light-output side of the second optical fiber being a side from which the forward-propagating light is outputted.

2. The light power monitoring device as set forth in claim 1, further comprising:
a reinforced member,
the high-refractive-index resin layer covering the low-refractive-index resin layer and being provided in the reinforced member,
part of the reinforced member which part faces the low-refractive-index resin layer via the high-refractive-index resin layer is a light absorbing part,
part of the reinforced member which part does not face the low-refractive-index resin layer via the high-refractive-index resin layer is a light reflecting part.

3. A fiber laser comprising:
a light power monitoring device recited in claim 1;
an upstream optical fiber which functions as an amplification medium; and
downstream optical fibers each of which functions as a transmission medium that transmits light outputted from the upstream optical fiber,
the light power monitoring device being provided between the downstream optical fibers.

4. A light power monitoring device for measuring power of light leaking from a side surface of an optical fiber with use of a light detecting section, comprising:
a first optical fiber;
a second optical fiber which is connected to the first optical fiber and which is located on a forward-propagating-light-output side of the first optical fiber, the forward-propagating-light-output side of the first optical fiber being a side from which forward-propagating light is outputted;

a low-refractive-index resin layer which covers (i) a connection between the first and the second optical fibers and (ii) a region of the first optical fiber which region extends in a predetermined range from the connection, the low-refractive-index resin layer having a refractive index lower than that of a cladding of the first optical fiber;

a high-refractive-index resin layer which covers at least a region of the first optical fiber which region is not covered by the low-refractive-index resin layer, the high-refractive-index resin layer having a refractive index equal to or higher than that of the cladding of the first optical fiber; and the light detecting section which has a light entering section and which detects light that has leaked from the cladding of the first optical fiber and has entered the light detecting section via the light entering section through the high-refractive-index-region layer, the light detecting section being provided so that the light entering section is located, in an axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer, the forward-propagating-light-input side of the first optical fiber being a side from which the forward-propagating light is inputted.

5. The light power monitoring device as set forth in claim 4, further comprising:
a reinforced member,
the high-refractive-index resin layer covering the low-refractive-index resin layer and being provided in the reinforced member,
part of the reinforced member which part faces the low-refractive-index resin layer via the high-refractive-index resin layer is a light absorbing part,
part of the reinforced member which part does not face the low-refractive-index resin layer via the high-refractive-index resin layer is a light reflecting part.

6. A fiber laser comprising:
a light power monitoring device recited in claim 4;
an upstream optical fiber which functions as an amplification medium; and
downstream optical fibers each of which functions as a transmission medium that transmits light outputted from the upstream optical fiber,
the light power monitoring device being provided between the downstream optical fibers.

7. A light power monitoring device for measuring power of light leaking from a side surface of an optical fiber with use of a light detecting section, comprising:
a first optical fiber;
a second optical fiber which is connected to the first optical fiber and which is located on a forward-propagating-light-output side of the first optical fiber, the forward-propagating-light-output side of the first optical fiber being a side from which forward-propagating light is outputted;
a low-refractive-index resin layer which covers (i) a connection between the first and the second optical fibers and (ii) respective regions of the first and the second optical fibers which regions extend in respective predetermined ranges from the connection, the low-refractive-index resin layer having a refractive index lower than that of a cladding of each of the first and the second optical fibers;

a high-refractive-index resin layer which covers at least respective regions of the first and the second optical fibers which regions are not covered by the low-refractive-index resin layer, the high-refractive-index resin layer having a refractive index equal to or higher than that of the cladding of the each of the first and the second optical fibers;

a first light detecting section which has a light entering section and which detects light that has leaked from the cladding of the second optical fiber and has entered the first light detecting section via the light entering section of the first light detecting section through the high-refractive-index-region layer; and a second light detecting section which has a light entering section and which detects light that has leaked from the cladding of the first optical fiber and has entered the second light detecting section via the light entering section of the second light detecting section through the high-refractive-index-region layer, the first light detecting section being provided so that the light entering section of the first light detecting section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer which end is located on the forward-propagating-light-output side of the second optical fiber, the forward-propagating-light-output side of the second optical fiber being a side from which the forward-propagating light is outputted, the second light detecting section being provided so that the light entering section of the second light detecting section is located, in the axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer which end is located on the forward-propagating-light-input side of the first optical fiber, the forward-propagating-light-input side of the first optical fiber being a side from which the forward-propagating light is inputted.

8. The light power monitoring device as set forth in claim 7, further comprising:
a reinforced member,
the high-refractive-index resin layer covering the low-refractive-index resin layer and being provided in the reinforced member,
part of the reinforced member which part faces the low-refractive-index resin layer via the high-refractive-index resin layer is a light absorbing part,
part of the reinforced member which part does not face the low-refractive-index resin layer via the high-refractive-index resin layer is a light reflecting part.

9. A fiber laser comprising:
a light power monitoring device recited in claim 7;
an upstream optical fiber which functions as an amplification medium; and downstream optical fibers each of which functions as a transmission medium that transmits light outputted from the upstream optical fiber, the light power monitoring device being provided between the downstream optical fibers.

10. A light power monitoring method for measuring power of light leaking from a side surface of an optical fiber with use of a light detecting section, comprising the steps of:

covering (i) a connection between a first optical fiber and a second optical fiber which is located on a forward-propagating-light-output side of the first optical fiber and (ii) a region of the second optical fiber which region extends in a predetermined range from the connection, with a low-refractive-index resin layer having a refractive index lower than that of a cladding of the second optical fiber, the forward-propagating-light-output side of the first optical fiber being a side from which forward-propagating light is outputted;

covering at least a region of the second optical fiber which region is not covered by the low-refractive-index resin layer, with a high-refractive-index resin layer having a refractive index equal to or higher than that of the cladding of the second optical fiber; and providing a light detecting section, having a light entering section, so that the light entering section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer, and detecting, with use of the light detecting section, light which has leaked from the cladding of the second optical fiber and has entered the light detecting section via the light entering section through the high-refractive-index-region layer, the forward-propagating-light-output side of the second optical fiber being a side from which the forward-propagating light is outputted.

11. A light power monitoring method for measuring power of light leaking from a side surface of an optical fiber with use of a light detecting section, comprising the steps of:

covering (i) a connection between a first optical fiber and a second optical fiber, the first optical fiber being located on a forward-propagating-light-input side of the second optical fiber, and (ii) a region of the first optical fiber which region extends in a predetermined range from the connection, with a low-refractive-index resin layer having a refractive index lower than that of a cladding of the first optical fiber, the forward-propagating-light-input side of the second optical fiber being a side from which forward-propagating light is inputted;

covering at least a region of the first optical fiber which region is not covered by the low-refractive-index resin layer, with a high-refractive-index resin layer having a refractive index equal to or higher than that of the cladding of the first optical fiber; and providing a light detecting section, having a light entering section, so that the light entering section is located, in an axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer, and detecting, with use of the light detecting section, light which has leaked from the cladding of the first optical fiber and has entered the light detecting section via the light entering section through the high-refractive-index-region layer, the forward-propagating-light-input side of the first optical fiber being a side from which the forward-propagating light is inputted.

12. A light power monitoring method for measuring power of light leaking from a side surface of an optical fiber with use of a light detecting section, comprising the steps of:

covering (i) a connection between a first optical fiber and a second optical fiber which is located on a forward-propagating-light-output side of the first optical fiber and (ii) respective regions of the first and the second optical fibers which regions extend in respective predetermined ranges from the connection, with a low-refractive-index resin layer having a refractive index lower than that of a cladding of each of the first and the second optical fibers, the forward-propagating-light-output side of the first optical fiber being a side from which forward-propagating light is outputted;

covering at least respective regions of the first and the second optical fibers which regions are not covered by the low-refractive-index resin layer, with a high-refractive-index resin layer having a refractive index equal to or higher than that of the cladding of the each of the first and the second optical fibers;

providing a first light detecting section, having a light entering section, so that the light entering section of the first light detecting section is located, in an axial direction of the first and the second optical fibers, at a position corresponding to an end of the low-refractive-index resin layer which end is located on a forward-propagating-light-output side of the second optical fiber or at a position which is away toward the forward-propagating-light-output side of the second optical fiber from the position corresponding to the end of the low-refractive-index resin layer which end is located on the forward-propagating-light-output side of the second optical fiber, and detecting, with use of the first light detecting section, light which has leaked from the cladding of the second optical fiber and has entered the first light detecting section via the light entering section of the first light detecting section through the high-refractive-index-region layer, the forward-propagating-light-output side of the second optical fiber being a side from which the forward-propagating light is outputted; and providing a second light detecting section having a light entering section so that the light entering section of the second light detecting section is located, in the axial direction of the first and the second optical fibers, at a position corresponding to an end of the low-refractive-index resin layer which end is located on a forward-propagating-light-input side of the first optical fiber or at a position which is away toward the forward-propagating-light-input side of the first optical fiber from the position corresponding to the end of the low-refractive-index resin layer which end is located on the forward-propagating-light-input side of the first optical fiber, and detecting, with use of the second light detecting section, light which has leaked from the cladding of the first optical fiber and has entered the second light detecting section via the light entering section of the second light detecting section through the high-refractive-index-region layer, the forward-propagating-light-input side of the first optical fiber being a side from which the forward-propagating light is inputted.

* * * * *